United States Patent Office 3,467,214
Patented Sept. 16, 1969

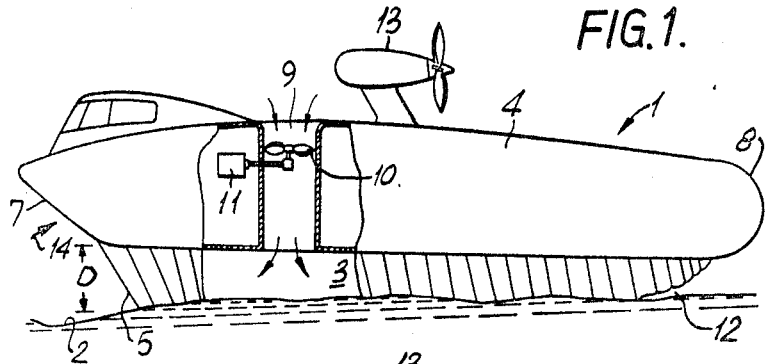
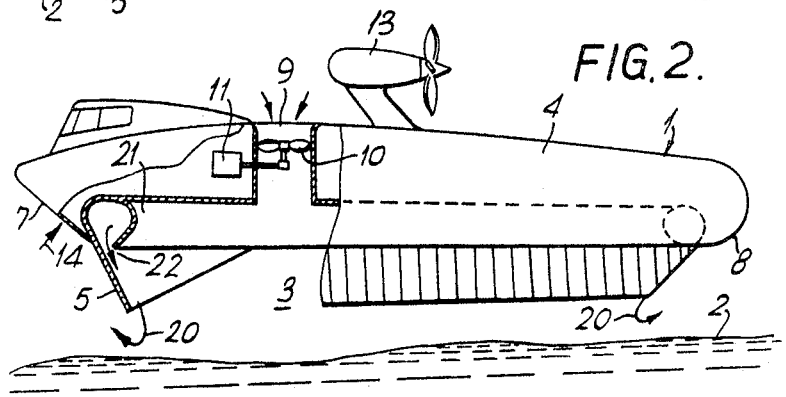
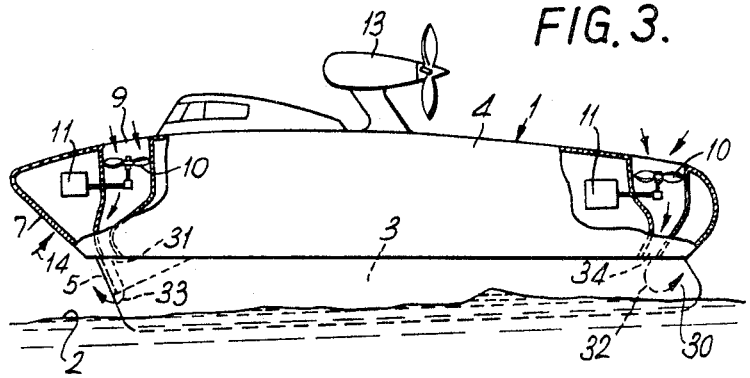

3,467,214
GAS-CUSHION VEHICLES WITH TAPERED SKIRTS
James Herbert William Wheatley, Southampton, England, assignor to Hovercraft Development Limited, London, England, a British company
Filed July 11, 1967, Ser. No. 652,485
Claims priority, application Great Britain, July 26, 1966, 33,635/66
Int. Cl. B60v 1/04, 1/16
U.S. Cl. 180—127                                   9 Claims

ABSTRACT OF THE DISCLOSURE

In a gas-cushion vehicle of the kind wherein the sides of the vehicle-supporting cushion are bounded, at least in part, by flexible or rigid wall structure depending from the vehicle body, the vertical depth of the wall structure at the bow end of the vehicle differs from that at the stern end thereof so that, in operation, the vehicle assumes either a nose-up trim or nose-down trim.

A nose-up trim provides vehicles operating at speeds up to about 120 knots with an improved "ride" and for those operating at greater speeds with a counter to overturning moments resulting from the application of aerodynamic lift forces.

---

This invention relates to gas-cushion vehicles, that is to say, to vehicles for travelling over a surface and which, in operation, are supported above the surface, at least in part, by a cushion of pressurised gas formed and contained beneath the vehicle body, and the invention is concerned with gas-cushion vehicles of the kind wherein the sides of the vehicle-supporting cushion are bounded, at least in part, by wall structure, such as a flexible skirt, depending from the vehicle body.

The wall structure may be of flexible or rigid construction and may be used either with or without fluid curtains issuing from its bottom.

Water tank tests conducted on models of gas-cushion vehicles show that an improved "ride" and improved maneuverability can be obtained when the model possesses a nose-up trim. In the tests conducted, the nose-up trim has resulted from aerodynamic lift being imparted to the model and this lift varies according to the aerodynamic shape of the model and the speed at which it is operated or it has resulted from the weight distribution of the model.

On the other hand, it is likely that in the case of vehicles yet to be built and which, when built, will operate at very high speeds (for example, 120 knots and above), aerodynamic lift could be a disadvantage as its forces could then be large enough to apply an overturning moment to a vehicle.

According to the invention, a gas-cushion vehicle of the kind wherein sides of the vehicle-supporting cushion are bounded, at least in part, by wall structure depending from the vehicle body, is characterised in that the vertical depth of the wall structure at the front end of the cushion differs from that at the rear end thereof, whereby in operation the vehicle assumes a trim inclined to the horizontal.

An embodiment of the invention will now be described by way of example with reference to the accompanying drawings wherein:

FIGURE 1 is a side view, with parts cut away, of a "plenum-chamber" gas-cushion vehicle, FIGURE 2 is a side view, with parts cut away, of the vehicle of FIGURE 1 modified so as to become a "curtain" gas-cushion vehicle, FIGURE 3 is a side view, with parts cut away, of the vehicle of FIGURE 1 modified so as to become a "sidewall" gas-cushion vehicle.

With reference to FIGURE 1, a gas-cushion vehicle 1 is shown travelling over a water surface 2 and supported thereover by a cushion 3 of pressurised air formed beneath the vehicle body 4 and contained thereunder by a wall structure 5 or "skirt" of flexible construction depending from the periphery of the vehicle body. The vertical depth D of the wall structure 5 is greater at the rearwardly-sloping front or bow end of the cushion 3 than at the rear or stern end thereof whereby, as shown, in normal operation, the vehicle assumes a trim which is "nose-up" relative to the horizontal.

In further detail, the vehicle 1 is of the so-called "plenum-chamber" type wherein ambient air is drawn in through an atmospheric air intake 9 by a fan 10 driven by a variable speed engine 11 and discharged downwardly through the floor of the vehicle body into the space occupied by the air cushion 3. Most of the air surplus to cushion-forming requirements escapes to atmosphere by way of a small clearance gap 12 formed between the bottom of a cut-back stern portion of the wall structure 5 and the water surface 2. The vehicle 1 is propelled over the water by an air-screw propulsion unit 13. The propulsion unit 13 is swivel-mounted so as to allow the vehicle to be steered. Propulsion of the vehicle is also assisted by thrust applied to the vehicle body 4 by the atmosphere-seeking flow of cushion air escaping from beneath the vehicle 1 by way of the escape path defined by the gap 12 at the rear end of the vehicle.

The flexible wall structure or "skirt" 5 is of the form disclosed in co-assigned copending application Ser. No. 566,948, filed July 21, 1966, now Patent No. 3,420,330, and comprises a succession of contiguous, independently deflectable wall members. The bottoms of the wall members, save those at the stern of the vehicle, are in light contact with the water surface 2 and this causes them to be deflected rearwardly, as shown. The wall structure 5 extends completely around the vehicle body 4 so as to bound not only the sides of the cushion 3 but also the fore and aft ends thereof. The wall structure 5 is "tailored" so that its height is progressively reduced from fore to aft. In operation, small gaps exist between the lower ends of neighbouring wall members and further air surplus to cushion forming requirements escapes to atmosphere through these gaps.

The vehicle 1 assumes its nose-up trim in the following manner:

With the vehicle 1 at rest, i.e., with its body 4 supported by the surface 2 and the flexible wall structure 5 in a collapsed condition, the fan 10 is started up to feed pressurised air to beneath the body 4. As more and more air is fed to beneath the body 4, the body rises steadily maintaining a substantially horizontal attitude, the pressurised air being contained by the flexible wall structure 5 as it is unfolded by upward movement of the vehicle body.

When the vehicle body 4 rises above the surface 2 to a position where the stern end of the flexible wall structure 5 loses contact with the surface 2, air escapes to atmosphere by way of the cut-back stern portion of the structure. The vehicle could be made to hover in this position indefinitely if the feed of air provided by the fan 10 was kept at the same rate as that escaping to atmosphere, but the rating of the fan is such that a substantially higher flow of air is fed to beneath the vehicle body. Consequently, as more and more air is fed to beneath the body 4 than escapes from the same region, the vehicle is steadily "pumped up" until it assumes the desired nose-up attitude.

As the vehicle 1 travels at speed over the water surface 2 the induced head wind forces apply an upwardly-acting component 14 of aerodynamic lift to the underside of the rearwardly-sloping bow 7 of the vehicle body, which component assists the nose-up trim caused by the "tailored" wall structure 5.

Due to cushion pressure acting on the rearwardly-sloping bottom surface of the vehicle body 4, a rearwardly-acting component of thrust is applied to the vehicle. However, this thrust does not affect vehicle performance substantially as it is balanced by a forwardly-acting component of thrust resulting from cushion pressure acting on the additional surface area possessed by the bow portion of the wall structure 5 over the stern portion thereof.

The above-described method of obtaining nose-up trim is superior to obtaining the same effect by providing a trim-weight at the rear 8 of the vehicle 1 as the latter method causes the rear part of the wall structure 5 to contact the surface 2, thus introducing drag loads, and the front part of the structure 5 to lift clear of the surface 2, thus allowing cushion air to escape to atmosphere. Furthermore, it reduces the vehicle to surface clearance.

With reference now to FIGURE 2, wherein components similar to those of FIGURE 1 have the same reference numerals, the vehicle 1 has been modified so that the upper peripheral part of the cushion 3 is bounded by the flexible wall structure 5 and the lower peripheral part thereof is bounded by an air curtain 20 which issues from the bottom of the wall structure. The air cushion 3 of FIGURE 2 is therefore made deeper than the cushion 3 of FIGURE 1 by the height of the air curtain 20.

In the modification of FIGURE 2, air is discharged by the fan 10 into an annular duct 21 extending around the lower periphery of the vehicle body. The bottom of the duct 21 is apertured to provide an annular port or nozzle 22 through which the air is discharged to flow downwardly over the interiors of the wall members forming the wall structure 5 to issue from the bottoms thereof as the air curtain 20. The air curtain 20 is of substantially uniform height and thickness for the whole of its periphery. The flexible wall structure 5 of this modification decreases in vertical depth from bow to stern, but does not have its stern portion cut back as does the structure 5 of FIGURE 1. The rearwardly-acting component of thrust applied to the sloping bottom surface of the vehicle body is substantially balanced in the same way as in the arrangement of FIGURE 1.

With reference now to the modification of FIGURE 3, wherein components similar to those of FIGURE 1 again have the same reference numerals, the sides of the cushion 3 of this arrangement are bounded by a wall structure in the form of a spaced-apart pair of longitudinal wall members 30 extending downwardly in substantially parallel array from the sides of the vehicle body 4. The fore end of the cushion 3 is bounded by an air curtain 33 and a short-depth wall structure 5 and the aft end thereof by an air curtain 32 only.

The wall members 30 are of rigid construction and extend lengthwise along the sides of the vehicle body, the bottoms of the wall members dipping into the water beneath the vehicle to contain the sides of the cushion 3. In accordance with the invention the wall members 30 are tapered so that the depth of each wall member is greater at the bow end of the cushion 3 than at the stern end thereof. The wall members 30 taper progressively along their lengths and the degree of taper is such that wall member 30 dips into the water 2 to a substantially uniform depth along its entire length.

In this arrangement two fan units 10, 11 are provided, one at each end of the vehicle body, supplying air to nozzles or ports 31, 34, formed in the bottom surface of the vehicle body and extending across the gaps between the fore and aft ends respectively of the wall members 30.

The rearwardly-acting thrust component applied to the sloping bottom surface of the vehicle body 4 is substantially balanced by containing the upper forward part of the cushion 3 by the flexible wall structure 5 which is disposed adjacent the port 31 so that air discharging therefrom flows down the interior of the wall structure to issue from its bottom as the air curtain 33. The depth of the wall structure 5 is such that cushion pressure acting on its area results in a forwardly-acting component of thrust being applied to the vehicle body which balances the above-mentioned rearwardly-acting component.

It will be appreciated that, because they have to contain the same cushion pressure, air curtains 33, 32 are of the same height and thickness.

In (non-illustrated) modifications of the vehicles of FIGURES 1, 2 and 3, the vehicles are given a nose-down instead of a nose-up attitude. Taking as an example the vehicle 1 of FIGURE 1, the nose-down attitude is provided by making the vertical depth of the flexible skirt 5 greater at the rear end of the cushion 3 than at the front end thereof. These modifications are likely to be useful on high speed vehicles to be built in the future and which will have operating speeds of 120 knots and above where aerodynamic lift forces may otherwise apply moments of sufficient magnitude to result in overturning of the vehicles. However, as the vehicles have a normal nose-down attitude, this will largely negate the effect of the aerodynamic lift forces. In practice, the degree of nose-down trim will be chosen which will ensure that, in foreseeable circumstances, aerodynamic lift will never be large enough to overturn the vehicle.

Nose-down trim may also be of value in counteracting aerodynamic lift forces applied to gas-cushion vehicles operating on a prepared track, for example, the vehicles described and illustrated in co-assigned application Ser. No. 639,488, filed May 18, 1967, may be modified in this way.

I claim:
1. A gas-cushion vehicle comprising a body, means including a pair of wall structures depending from the sides of the vehicle body for completely surrounding the vehicle-supporting cushion, and means for supplying gas under pressure to the cushion at a greater rate than that at which gas escapes from the cushion to the atmosphere beneath the wall structures during initial formation of the cushion, the vertical depth of the wall structures being greater at one end than at the other end thereof and the wall structures being progressively tapered from the said one end to the said other end so that, in operation, the vehicle body assumes a trim inclined to the horizontal.

2. A vehicle as claimed in claim 1 wherein the vertical depth of the wall structures at the front end of the cushion is greater than that at the rear end of said cushion whereby the vehicle assumes a nose-up trim.

3. A vehicle as claimed in claim 1 wherein the vertical depth of the wall structures at the front end of the cushion is greater than that at the rear end of said cushion whereby the vehicle assumes a nose-up trim, and wherein the underside of the front end of the vehicle body slopes downwardly in a rearward direction whereby an upwardly-acting component of aerodynamic lift is applied to the vehicle body, which component assists said nose-up trim.

4. A vehicle as claimed in claim 1 wherein the wall structures are of flexible construction.

5. A vehicle as claimed in claim 1 wherein a rear portion of each wall structure is cut back to define with the surface over which the vehicle operates a cushion gas escape path whereby a flow of atmosphere-seeking gas escapes from beneath the vehicle to apply a propulsive thrust to the vehicle body.

6. A vehicle as claimed in claim 1 having means for forming a curtain of pressurized fluid between the wall structures and the surface over which the vehicle operates so as to assist the wall structures in containing the vehicle-supporting cushion.

7. A vehicle as claimed in claim 1 wherein each of said wall structures is of flexible construction comprising a plurality of independently deflectable flexible wall members each having an outer portion which forms part of the boundary of the vehicle-supporting cushion and a pair of side portions which extend inwardly from said outer portion towards said cushion, a side portion of each wall member being contiguous with the adjacent side portion of a neighboring wall member.

8. A gas-cushion vehicle having a body adapted, in operation, to assume a fore-and-aft trim inclined to the horizontal comprising means for completely surrounding the vehicle-supporting cushion including a pair of cushion-bounding wall structures depending from the sides of the vehicle and extending along substantially the whole length of the vehicle-supporting cushion, the wall structures being of greater vertical depth at one end than at the other end thereof and progressively tapering from the said one end to the said other end thereof, and means for supplying gas under pressure to the cushion space during initial formation of the cushion at a rate greater than that at which gas escapes from the cushion to the atmosphere beneath the wall structure so as to form and maintain a cushion of gas in said space supporting the vehicle body with the lower edges of the wall structures uniformly disposed along their length in relation to the surface over which the vehicle is to travel, so that the fore-and-aft axis of the body of the vehicle is inclined with respect to said surface.

9. A method for causing a gas-cushion vehicle having a body and means for completely surrounding the vehicle-supporting cushon including a pair of cushion-bounding wall structures depending from the sides of the vehicle and extending along substantially the whole length of the vehicle-supporting cushion to be formed beneath the vehicle body, the wall structures being of greater vertical depth at one end than at the other end thereof and progressively tapering from the said one end to the said other end thereof to assume, in operation, a fore and aft trim inclined to the horizontal, comprising the step of supplying gas under pressure to the cushion space during initial formation of the cushion at a rate greater than that at which gas escapes from the cushion to the atmosphere beneath the wall structures so as to form and maintain a cushion of gas in said space supporting the vehicle body with the lower edges of the wall structures uniformly disposed along their length in relation to the surface over which the vehicle is to travel, so that the fore-and-aft axis of the body of the vehicle is inclined with respect to said surface.

References Cited
UNITED STATES PATENTS

| 1,412,848 | 4/1922 | Dunajeff. | |
|---|---|---|---|
| 3,027,860 | 4/1962 | Priest | 180—126 X |
| 3,334,701 | 8/1967 | Chaplin | 180—127 |

A. HARRY LEVY, Primary Examiner

U.S. Cl. X.R.

180—126